Patented Feb. 24, 1942

2,273,922

UNITED STATES PATENT OFFICE 2,273,922

FLUORINE-CONTAINING COMPOUNDS OF THE NAPHTHALENE SERIES

Anthony F. Benning, Woodstown, and Hans B. Gottlieb, Pitman, N. J., assignors to E. I. du Pont de Nemours & Company, Wilmington, Del., a corporation of Delaware No Drawing. Application July 9, 1940,
Serial No. 344,542

2 Claims. (Cl. 260—649)

This invention relates to the preparation of new compounds of the naphthalene series and more particularly to the preparation of trifluoromethyl-naphthalenes useful as intermediates in the manufacture of dyes and fine chemicals. The invention further relates to a new and improved process for the introduction of the trifluoromethyl groups into compounds of the naphthalene series.

While the preparation of trifluoromethyl compounds of the benzene series have been described in the literature and a number of trifluoromethyl-benzene derivatives are known, the processes employed for their preparation do not give trifluoromethyl derivatives of the naphthalene series. The introduction of fluorine into dyestuffs have been found to give very desirable shade variations and in many cases it materially improved fastness properties. It is therefore the object of this invention to produce compounds of the naphthalene series which contain the trifluoromethyl group and which will be useful as dyestuff intermediates and as intermediates for the manufacture of fine chemicals.

We have found that the trifluoromethyl group can be introduced into the naphthalene ring system by heating naphthalene with carbon tetrachloride and anhydrous hydrogen fluoride in the presence of copper.

The following example is given to illustrate the invention more fully. The parts used are by weight.

Example

Sixty-four parts of naphthalene, 480 parts by weight carbon tetrachloride, 8 parts copper bronze and 300 parts liquid anhydrous hydrogen fluoride are charged at 0° C. into a rotary steel autoclave capable of withstanding high pressure. The autoclave is closed at 0° C. and heated with agitation to 150–155° C. for 48 hours. After cooling the pressure is gradually released, the content is poured into ice water, 800 parts by weight of carbon tetra-chloride are added and the whole filtered upon a suction filter. The residue upon the filter is washed with carbon tetrachloride and the wash liquid united with the original filtrate. The organic layer is separated from the aqueous solution and most of the solvent removed at room temperature in a current of air.

The resulting concentrated solution is then subjected to fractional distillation. The fraction going over at 103–104° C. and 2.5 mm. mercury pressure is free of chlorine. This part of the reaction mass is refractionated and the product boiling at 101° C. and 2.5 mm. mercury pressure is separated. At room temperature it is a white crystalline mass of characteristic odor.

Two subsequent crystallizations from a low boiling ligroin yield a mono-trifluoromethyl-naphthalene, which melts at 92° C. and analyzes 28.9% fluorine.

From the remaining fractions obtained in the above fractionation and from the mother liquor in the recrystallization of the 101° C. fraction another fluorine containing aromatic compound is obtained which when purified by crystallization from ligroin melts at 54° C. and contains 41.5% F and no chlorine. Its molecular weight is above 500.

It will be quite obvious to those skilled in the art that the conditions under which this invention may be carried out may be varied within reasonable limits. To avoid extreme pressures the reaction may be carried out in an apparatus where part of the pressure may be released during the reaction. The temperature may be varied with the pressures employed.

We claim:
1. Trifluoromethyl-naphthalene.
2. A process for preparing trifluoromethyl-naphthalene which comprises reacting naphthalene with carbon tetrachloride and anhydrous hydrogen fluoride in the presence of copper.

ANTHONY F. BENNING.
HANS BILLROTH GOTTLIEB.